United States Patent [19]

Bernhardt et al.

[11] Patent Number: 4,904,026
[45] Date of Patent: Feb. 27, 1990

[54] BRAKE SYSTEM

[75] Inventors: Wolfgang Bernhardt, Korntal-Muenchingen; Michael Tischer, Abstatt, both of Fed. Rep. of Germany

[73] Assignee: Robert Bosch GmbH, Stuttgart, Fed. Rep. of Germany

[21] Appl. No.: 254,558

[22] Filed: Oct. 7, 1988

[30] Foreign Application Priority Data

Oct. 13, 1987 [DE] Fed. Rep. of Germany ....... 3734601

[51] Int. Cl.$^4$ .......................... B60T 13/16; B60T 8/44; B60T 17/00
[52] U.S. Cl. ...................................... 303/10; 303/114; 303/116; 188/359; 60/565
[58] Field of Search ...................... 303/10, 50, 54, 68, 303/71, 114, 116, 119, 113; 188/181 A, 181 R, 355, 358, 359; 60/565, 581, 591

[56] References Cited

U.S. PATENT DOCUMENTS

| | | | |
|---|---|---|---|
| 3,727,986 | 4/1973 | Koivunen | 188/359 X |
| 3,827,763 | 8/1974 | Kobashi et al. | 303/114 |
| 4,181,373 | 1/1980 | Adachi | 303/10 |
| 4,706,460 | 11/1987 | Kervagoret | 60/565 |

FOREIGN PATENT DOCUMENTS 3413430 10/1985 Fed. Rep. of Germany .

Primary Examiner—Andres Kashnikow
Assistant Examiner—Timothy Newholm
Attorney, Agent, or Firm—Edwin E. Greigg

[57] ABSTRACT

A brake system having a master brake cylinder with at least one piston in a stepped bore in which the piston is acted upon at one end by a piston rod and on the other end defines a pressure chamber, from which an outlet or a brake line leads to wheel brake cylinders of at least one brake circuit. The pressure chamber, or the brake line discharging from this pressure chamber communicates on the one hand with a compensation chamber and on the other with an annular chamber, the volumes of both these chambers being variable contrarily by movement of the piston. The connection between the pressure chamber and the compensation chamber is interrupted by a valve, and a connection is then established with a fluid reservoir. A suitable amount of fluid can then be transported from this fluid reservoir into the compensation chamber by means of a return pump.

20 Claims, 1 Drawing Sheet

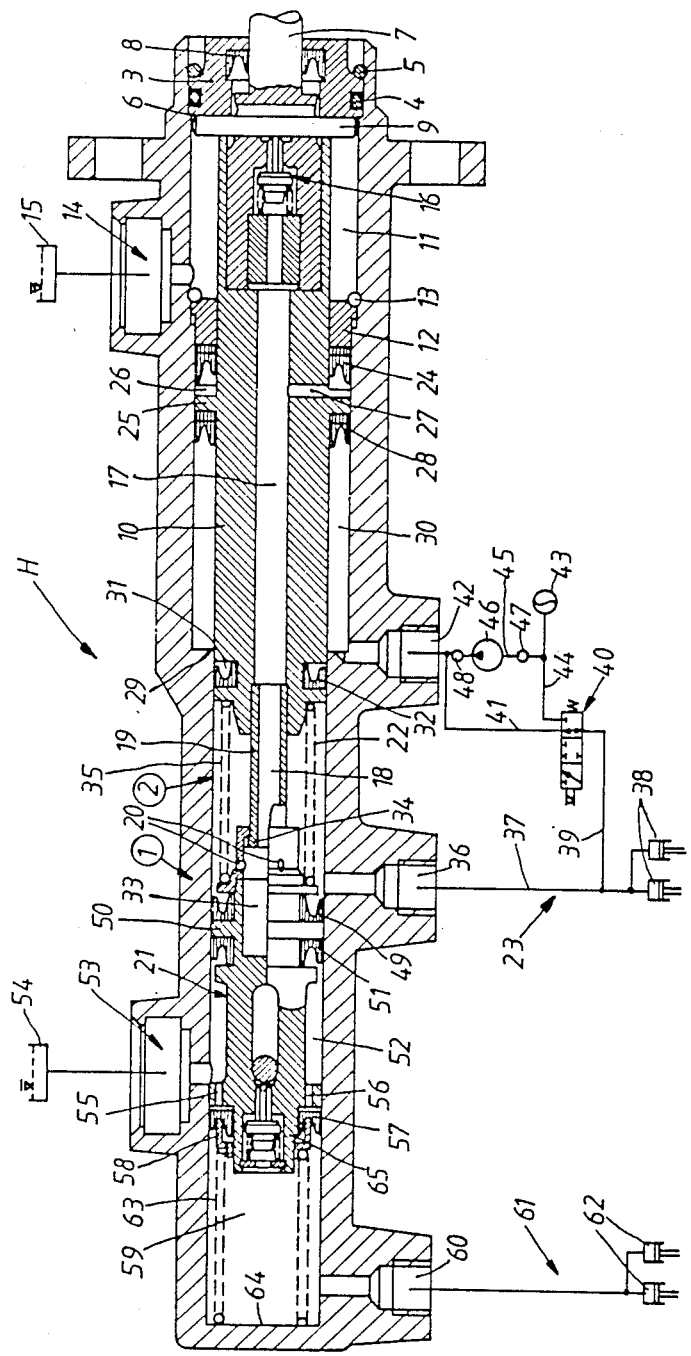

// BRAKE SYSTEM

BACKGROUND OF THE INVENTION

The invention relates to a brake system having a master brake cylinder.

A great number of anti-skid brake systems, also called anti-lock systems, are known in the field. In these systems, in order to reduce the brake pressure, fluid, as a rule, is pumped into a chamber and counter-acts the brake pressure; that is, it moves the brake piston, a corresponding piston rod or a brake pedal back to its outset position. Typically, this pressure reduction is controlled via a plurality of valves, as shown for instance in German Offenlegungsschrift 34 13 430. This great number of valves represents considerable engineering effort and expense. Moreover, the return of the brake pedal for the sake of pressure reduction often feels unpleasantly hard to the driver, especially in very forceful braking, in which the pressure reduction takes place suddenly.

OBJECT AND SUMMARY OF THE INVENTION

A brake system according to the invention has a pressure chamber, which communicates on one side with a compensation chamber and on the other side with an annular chamber, the volume of both are variable contrary to one another by the motion of the piston, at the brake pressure of the piston rod.

An essential feature is that the entire system between the compensation chamber, the pressure chamber and the variable annular chamber is balanced in such a way that if the volume of the compensation chamber, for instance, decreases, then the volume of the annular chamber is increased and is filled directly or indirectly with the fluid flowing out of the compensation chamber.

One essential element in the present invention is a valve, preferably a magnetic valve, which is incorporated into the connection between the pressure chamber and the compensation chamber. With this valve, if the wheels lock the communication between the pressure chamber and the compensation chamber is blocked, and at the same time a connection between the pressure chamber and a fluid reservoir is opened. As a result, brake fluid can readily drain into this fluid reservoir, thus reducing the pressure in the brake line or in the pressure chamber.

If the piston or the brake pedal is then to be returned to its outset position, a return pump is provided for this purpose, which pumps fluid out of the fluid reservoir back into the compensation chamber. This arrangement produces a closed system, so that no fluid from a different source is needed for returning the brake pedal, as would for instance be the case if the compensation chamber communicated directly with the annular chamber and the pressure chamber could be relieved via its own magnetic valve to a suitable fluid reservoir. Although this concept does have some disadvantages, it is nevertheless within the scope of the present invention. In that case, however, at least two valves would then be necessary.

The advantage of this arrangement according to the invention is above all that a pressure reduction can be performed without causing a return of the piston or brake pedal. This return is performed separately by the work of the return pump, so that the fluid return can be arranged to occur much more gradually.

The compensation chamber and the annular chamber may be provided an any suitable location in the master brake cylinder. It must merely be assured that the work of the piston produces a variation in the two chambers. Preferably, the compensation chamber is embodied as an annular space around the piston, between a housing step and a lip seal in the stepped bore. The variable annular chamber should then be embodied upon this lip seal, again surrounding the piston. To provide suitable support, particularly for the lip seal that seals off the compensation chamber, a ring flange is integrally formed onto the piston. The annular chamber is then defined on the other side of this ring flange by a stationary lip seal, which may optionally be followed by a slide ring serving to guide the piston.

When the volume of the compensation chamber decreases, fluid flows directly into the pressure chamber or, for example, into the brake line, optionally via suitable lines. However, since the pressure chamber communicates with the expanding annular chamber, an exchange of fluid takes place. This preferably occurs through an axial bore in the piston as well as through a transverse bore that leads to the annular chamber.

In the event that two separate brake circuits having two separate pressure chambers and two pistons are provided, then the two pistons should communicate with one another in such a way that once again, a fluid exchange takes place, through the pistons, to the annular chamber. In the present exemplary embodiment, this is done through a connecting tube, which engages a blind bore toward the face end of the second piston and is movably supported in this bore. Via suitable openings, fluid can drain out of the one pressure chamber through an axial bore in the connecting tube into the aforementioned axial bore in the other piston.

To allow proper equalization in terms of the fluid from the compensation chamber to the pressure chamber or to the annular chamber, at least the effective surface areas of the compensation chamber and annular chamber should be approximately equal. This prevents an unequal flow from disrupting proper braking action.

However, it appears to be most advantageous for the effective surface area of the compensation chamber and annular chamber to be equal in size, or only slightly greater, than the effective surface areas of the pressure chamber or chambers. This provision again equalizes the flow of fluid. On the other hand, the principle also makes it possible to design stepped piston master brake cylinders.

Taken all in all, the present invention discloses a brake system which makes a so-called single-channel system possible at a very favorable cost.

The invention will be better understood and further objects and advantages thereof will become more apparent from the ensuing detailed description of a preferred embodiment taken in conjunction with the drawing.

BRIEF DESCRIPTION OF THE DRAWING

The single figure is a longitudinal section through a master brake cylinder according to the invention, along with further elements of a brake system which are shown in block diagram form.

DESCRIPTION OF THE PREFERRED EMBODIMENT

The master brake cylinder H has a cylinder housing 1 with an axial stepped bore 2 having a plurality of steps.

Toward one face end of the cylinder housing 1, this stepped bore 2 has an opening occupied by a guide ring 3, which is braced against one step of the stepped bore 2 via a retaining ring 5 which seats in a groove in the wall of the bore. Sealing is effected via an o-ring 4. The depth to which the guide ring 3 extends into the stepped bore 2 is defined by a housing shoulder 6.

A piston rod 7 extends through the guide ring 3 and the piston rod is sealed off from the guide ring 3 by a lip seal 8. With its end face 9, this piston rod 7 contacts the end of a piston 10 of the master brake cylinder H. The piston extends through a large diameter portion of the stepped bore 2 with one end extending into a smaller diameter portion. A slide ring 12 surrounds the piston 10 in the large diameter portion of the bore and serves to guide the piston in the bore. At the same time, the slide ring 12 defines an annular space 11, between the slide ring 12 and the end face of piston 10. The slide ring 12 is retained in place by a shoulder of the bore 2 and a retaining ring 13.

Via a connection 14, the annular space 11 communicates with a supply container 15 for brake fluid. From the annular space 11, brake fluid can flow through a suitable valve assembly 16 in the end of piston 10 and an axial bore 17 in the piston 10 and through a further axial bore 18 in a connecting tube 19 which connects the piston 10 with a float piston 21. The fluid passes through suitable openings 20 in the float piston 21 into a first pressure chamber 22 for the first brake circuit 23. The pressure chamber surrounds the connecting tube 19 and an end portion of float piston 21. The valve assembly 16 will not be further described here, because its structure is well known.

Following the slide ring 12, a stationary lip seal 24 surrounds the piston 10; in the exemplary embodiment shown, this lip seal and a ring flange 25 of the piston 10 enclose a variable annular chamber 26. This variable annular chamber 26 in turn communicates via a radial bore 27 with the axial bore 17 in piston 10.

The ring flange 25 is followed by a further lip seal 28, which together with part of the stepped bore 2, a housing step 29 and part of the piston 10 encloses a compensation chamber 30. After the housing step 29, the diameter of the stepped bore 2 is approximately equivalent to the diameter of the piston 10, so that this piston is guided in the stepped bore 2. For the sake of sealing, a further lip seal 32 is inserted at this point into an annular conduit 31 of the piston 10.

The float piston 21 and the piston 10 communicate with one another via the aforementioned connecting tube 19. The connecting tube extends through the first pressure chamber 22 and with one end extending into a blind bore 33, engages the face end of the float piston 21. The connecting tube 19 is movably supported in this blind bore 33 and is secured against slipping out of the blind bore 33 by an annular collar 34 on its end. From the blind bore 33, the openings 20 in the float piston open into the first pressure chamber 22. The float piston 21 and the piston 10 are spaced from one another, via a helical spring 35 provided in the first pressure chamber 22. Thus, the maximum stroke of the float piston 21 is limited by the length of the connecting tube 19. Moreover, in the event one circuit should fail, or in other words if there is a pressure loss in the pressure chamber 22, the connecting tube 19 also acts as the mechanical connection between the piston 10 and the float piston 21.

From the first pressure chamber 22, an outlet 36 and a brake line 37 lead to wheel brake cylinders 38 of the first brake circuit 23. From this brake line 37, a branch line 39 leads to a magnetic valve 40. Via this magnetic valve 40, on the one hand, a communication with a connecting line 41 leading to a connection 42 to the compensation chamber 30 can be established. On the other hand, however, this valve 40 can also effect communication of the branch line 39 with a low-pressure reservoir 43 via line 44. From this line 44, a bypass line 45 also leads to the connection 42, or to a communication with the connecting line 41, via a return pump 46 bracketed by two check valves 47 and 48 in line 45.

The first pressure chamber 22 is defined on the left-hand side by a further lip seal 49, which surrounds the float piston 21 and strikes a ring flange 50 on the float piston. On this other side, a further lip seal 51 is braced against this ring flange 50 and in turn seals off an annular space 52. This annular space 52 has a corresponding connection 53 to a further supply container 54 for brake fluid.

On the other side of the lip seal 51, the annular space 52 is defined by a flange collar 55 of the float piston 21; this flange collar 55 is penetrated by parallel bores 56. The flange collar 55 is followed by a further lip seal 57, which is retained by a support ring 58. This lip seal 57 seals off a second pressure chamber 59, which has a connection 60 to a second brake circuit 61, and to wheel brake cylinders 62 of the second brake circuit 61. The float piston 21 contacts the support ring 58 and is supported by way of the support ring 58 against a helical spring 63, which is supported by the bottom 64 of the stepped bore 2.

Located in the float piston 21 in turn is a device, merely generally referred to as a valve assembly 65, via which communication between the annular space 52 and the second pressure chamber 59 can be established. The annular space 52 here is a known re-aspiration chamber or refill suction chamber such as the annular space 11.

The mode of operation of the master brake cylinder according to the invention is as follows:

In normal braking action, the magnetic valve 40 is in the switching position shown in the exemplary embodiment. That is, the fluid communication among the compensation chamber 30, the first pressure chamber 22 and the variable annular chamber 26 is open. The pressure of a brake pedal, not shown in detail, upon the piston rod 7 displaces the piston 10 to the left. This varies the volume of the compensation chamber 30, and the positively displaced fluid can drain out via the connection 42, the connecting line 41, the magnetic valve 40 and the branch line 39 into the brake line 37. At the same time, brake fluid from the first pressure chamber 22 is either additionally fed through the outlet 36 into the brake line 37, or at least a portion of this brake fluid flows through the openings 20 into the blind bore 33 and from there through the axial bore 18, the axial bore 17 and the radial bore 27 into the variable annular chamber 26. This brings about an equalization of the fluid moving in this circulatory loop. The brake pressure generated in the first pressure chamber 22 is unaffected thereby, although this assumes that the effective surface areas in the compensation chamber 30 and in the variable annular chamber 26 are of equal size.

If wheel locking should now necessitate a pressure reduction in both brake circuits 23 and 61, then the magnetic valve switches into its third position, in which the branch line 39 communicates with the low-pressure reservoir 43. As a result, brake fluid can flow into the low-pressure reservoir 43, so that the brake pressure in the brake cylinder 38 drops. This is possible, because the magnetic valve simultaneously blocks the communication from line 41 to 39 and therefore the piston 10 is blocked and cannot feed any further brake fluid into the first brake circuit. This means, however, that the piston 10 and hence, via the piston rod 7, the brake pedal as well remain in this position, rather than following up any pressure reduction. The pressure reduction takes place only in the first pressure chamber 22 and, by means of the compensating action of the float piston 21, in the second pressure chamber 59 as well.

If at this stage the return pump 46 switches on, then the existing pressure conditions do not change at all, because even though the fluid pumped into the compensation chamber 30 forces the piston 10 to move counter to the piston rod 7 or the brake pedal, thereby expanding the volume of the first pressure chamber 22, nevertheless this expansion is compensated for by the fluid flowing back out of the variable annular chamber 26 into the first pressure chamber 22 via the radial bore 27, the axial bores 17 and 18 and the openings 20. Thus no further pressure decrease or increase takes place.

If the pressure to the wheel brake cylinders 38 or 62 is now to be increased again, then the magnetic valve is switched back into its first switching position again, so that fluid can again flow out of the compensation chamber 30 into the brake line 37.

The pressure can also be kept constant, by means of a middle position of the magnetic valve 40.

In the present exemplary embodiment, although the connections 42, 46 and 60 are shown offset relative to one another, the connecting line 41 and the branch line 39 may naturally also communicate directly, via additional threaded connections, with the outlet 36; in that case, corresponding lines and T-joints can be dispensed with.

It has also proved advantageous to design the effective surface areas of the chambers 30 and 26 so that they are equal in size, or only slightly larger, than the effective surfaces areas of the first and second pressure chambers 22 and 59, respectively. The magnetic valve 40 and the pump 46 are controlled by a control unit 66, which is shown merely schematically.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A brake system comprising a master brake cylinder, a cylinder housing (1), a stepped bore (2) in said cylinder housing, a piston (10) in said stepped bore, a piston rod (7) acted upon on one end by a brake pedal, said piston rod contacts one end of said piston, a slide ring (12) surrounding said piston (10), a ring flange (25) on said piston, a variable annular chamber (26) surrounding said piston between said slide ring (12) and said ring flange, a fluid return pump; a compensation chamber (30) which surrounds said piston and communicates directly with a fluid outlet of said fluid return pump, a pressure chamber (22) acted on by said piston in said stepped bore, an outlet connection (36) from said pressure chamber to a brake line (37) in which said brake line leads to wheel brake cylinders of at least one brake circuit, said pressure chamber (22) communicates on one end with said annular chamber (26) and said brake line (37) communicates with a compensation chamber (30), the volumes of said pressure chamber (22) and said annular chamber (26) being variable relative to one another by a movement of said piston (10), and a fluid switching valve (40) connected with said brake line (37) between said pressure chamber (22) and said compensation chamber (30), by way of which in a second position valve fluid flow is blockable.

2. A brake system as defined by claim 1, in which said compensation chamber (30) is provided in the form of an annular space around the piston (10) between a housing step (29) and a seal (28), in the stepped bore (2).

3. A brake system as defined by claim 2, in which, following the seal (28), said variable annular chamber (26) includes a second seal (24).

4. A brake system as defined by claim 3, in which said ring flange (25) is integrally formed with said piston (10) and is provided between the first seal (28) and the variable annular chamber (26).

5. A brake system as defined by claim 3, in which following said second seal (24), said slide ring (12) guides said piston (10).

6. A brake system as defined by claim 2, in which said ring flange (25) is integrally formed with said piston (10) and is provided between the first seal (28) and the variable annular chamber (26).

7. A brake system as defined by claim 2, in which an effective pressure surface area of said compensation chamber (30) and said annular chamber (26) are approximately equal.

8. A brake system as defined by claim 1, in which said pressure chamber (22) communicates with said variable annular chamber (26) via an axial bore (17) and a transverse bore (27) in said piston (10).

9. A brake system as defined by claim 8, which includes a float piston (21) in axial alignment with said piston in order to form a second pressure chamber (59) for a second brake circuit, said float piston (21) includes a blind bore (33) toward a face end, a connecting tube (19) having one end supported in said blind bore and one end supported in said axial bore in said piston (10), openings (20) in said blind bore, said pressure chamber (22) communicating via said openings (20) as well as via an axial bore (18) in said connecting tube (19) with the axial bore (17) in the piston (10).

10. A brake system as defined by claim 1, in which an effective pressure surface area of said compensation chamber (30) and said annular chamber (26) are approximately equal.

11. A brake system as defined by claim 10, in which effective surface areas of said pressure chamber (22) and said pressure chamber (59) are approximately equal to those of said compensation chamber (30) and said annular chamber (26).

12. A brake system comprising a master brake cylinder, a cylinder housing (1), a stepped bore (2) in said cylinder housing, a piston (10) in said stepped bore, a piston rod (7) acted upon on one end by a brake pedal, said piston rod contacts one end of said piston, a slide ring (12) surrounding said piston (10), a ring flange (25) on said piston, a variable annular chamber (26) surrounding said piston between said slide ring (12) and said ring flange, a compensation chamber (30) surrounding said piston; a fluid return pump (46) connected to said compensation chamber, a pressure chamber (22) acted on by said piston in said stepped bore, an outlet connection (36) from said pressure chamber to a brake line (37) which leads to wheel brake cylinders of at least one brake circuit, said pressure chamber (22) communicates on one end with said annular Chamber (26) and said brake line (37) communicates with a compensation chamber (30), the volumes of said pressure chamber (22) and said annular chamber (26) being variable relative to one another by a movement of said piston (10), a fluid switching valve (40) connected with said brake line (37) between said pressure chamber (22) and said compensation chamber (30), by way of which in a second position valve fluid flow is blockable, and said fluid switching valve (40) being switchable to a third switching position which blocks the connection between the pressure chamber (22) and the compensation chamber (30) while connecting said pressure chamber (22) via said fluid return pump (46) with said compensation chamber (30).

13. A brake system as defined by claim 12, which includes a fluid line including said fluid return pump, at least one check valve (47, 48) in said fluid line between said fluid switching valve (40) and said compensation chamber (30).

14. A brake system as defined by claim 13, which includes a fluid reservoir (43) connected to a line (44) located between said fluid switching valve (40) and said fluid return pump (46).

15. A brake system as defined by claim 13, in which said compensation chamber (30) is provided in the form of an annular space around the piston (10) between a housing step (29) and a seal (28), in the stepped bore (2).

16. A brake system as defined by claim 13, in which an effective pressure surface area of said compensation chamber (30) and said annular chamber (26) are approximately equal.

17. A brake system as defined by claim 12, which includes a fluid reservoir (43) connected to a line (44) located between said fluid switching valve (40) and said fluid return pump (46).

18. A brake system as defined by claim 17, in which said compensation chamber (30) is provided in the form of an annular space around the piston (10) between a housing step (29) and a first seal (28), in the stepped bore (2).

19. A brake system as defined by claim 12, in which said compensation chamber (30) is provided in the form of an annular space around the piston (10) between a housing step (29) and a seal (28), in the stepped bore (2).

20. A brake system as defined by claim 12, in which an effective pressure surface area of said compensation chamber (30) and said annular chamber (26) are approximately equal.

* * * * *